United States Patent [19]

Morton et al.

[11] 4,227,776

[45] Oct. 14, 1980

[54] TURRET DEVICE

[75] Inventors: William A. Morton, North Palm Beach; John I. Caporini, Palm Beach Gardens, both of Fla.

[73] Assignee: United Technologies Corporation, Hartford, Conn.

[21] Appl. No.: 733,223

[22] Filed: May 27, 1968

[51] Int. Cl.$^3$ .................... G05D 25/00; F21K 27/00
[52] U.S. Cl. .................................. 350/285; 362/259
[58] Field of Search ................. 350/6, 7, 21, 22, 25, 350/26, 301, 6.5, 6.9; 331/94.5; 362/259; 356/141, 152; 250/342, 347, 353, 203 R

[56] References Cited

U.S. PATENT DOCUMENTS

| | | | |
|---|---|---|---|
| 3,471,234 | 10/1969 | Studebaker | 356/3 |
| 3,504,979 | 4/1970 | Stephany | 356/152 |

*Primary Examiner*—Stephen C. Buczinski
*Attorney, Agent, or Firm*—Jack N. McCarthy

[57] ABSTRACT

A turret device mounted on a housing is used to project a laser output beam and aim it in elevation and azimuth. The turret device includes a rotatable enclosure having an optical cavity for transmitting a laser beam therethrough and out a cutout to a target. Means are provided to operate the turret in azimuth and elevation. One control moves a turret platform to obtain an azimuth movement of the beam while the other moves a rotatable mirror to obtain an elevation movement of the beam. A laser device directs a laser beam from within a housing through the rotating part of the turret into the enclosure from which it follows the path set forth above.

3 Claims, 3 Drawing Figures

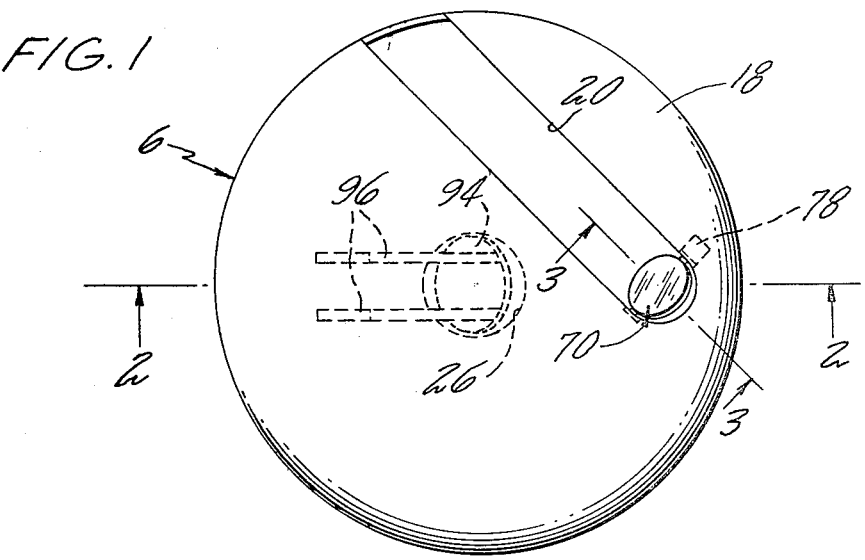
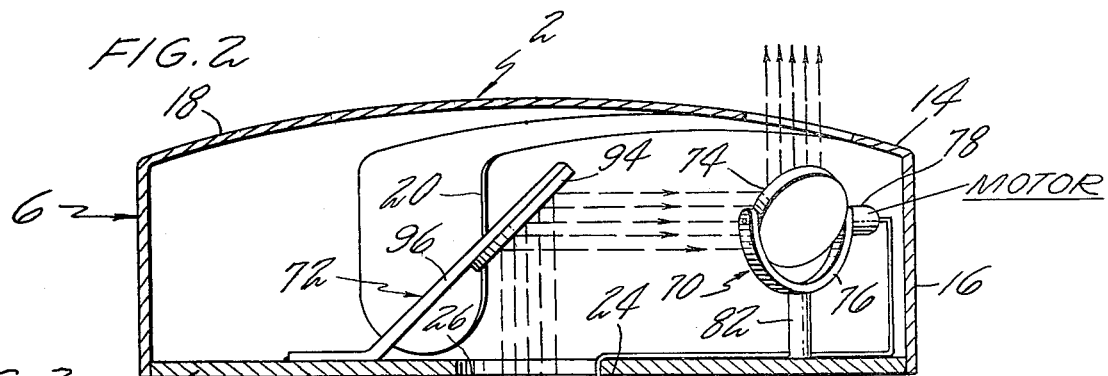
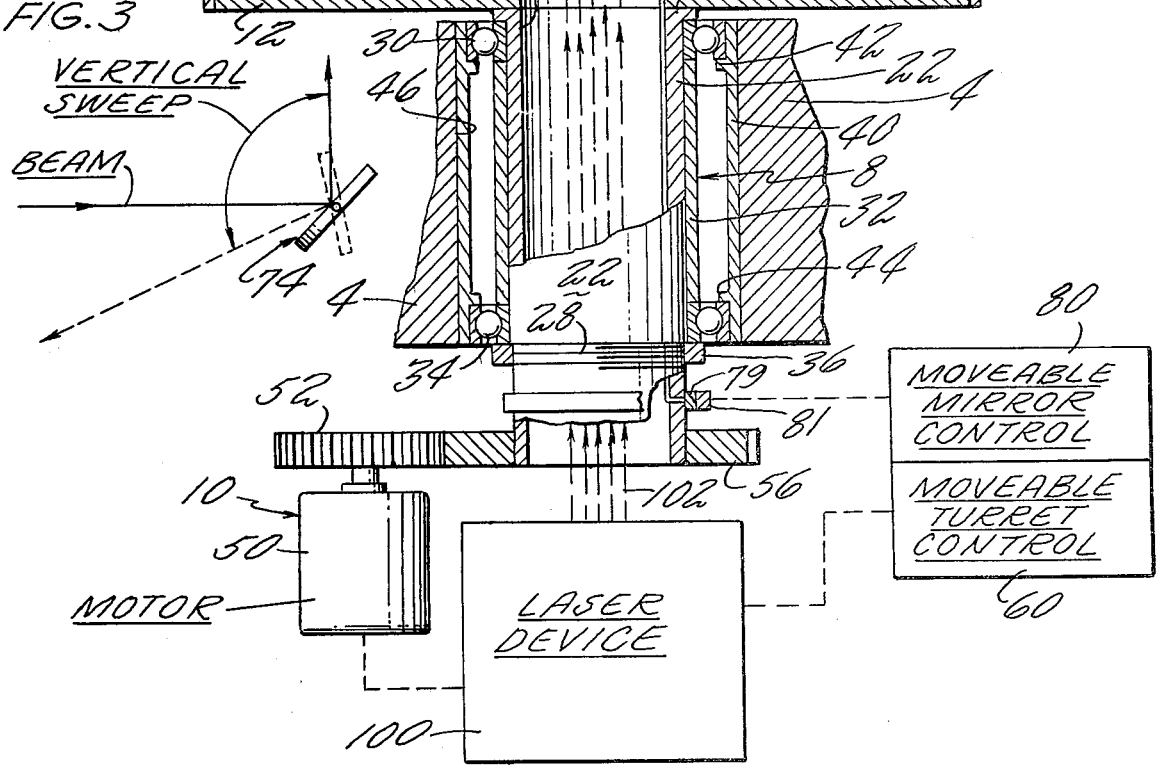

TURRET DEVICE

BACKGROUND OF THE INVENTION

This invention relates to a turret device, and especially to one for use with a laser device to direct a laser beam as an output beam.

SUMMARY OF THE INVENTION

In the turret device disclosed, means have been provided to keep the optical system as simplified as possible, yet allow continuous tracking over an entire hemisphere.

Another feature of the invention is to provide a turret which aims a laser output rather than aiming an entire laser device.

A turret of this type can be mounted in any position.

This device will optically transmit the output of a one (1) megawatt gas dynamic laser. However, this device is applicable to transmission of any level of power from any type of laser.

BRIEF DESCRIPTION OF THE DRAWINGS

FIG. 1 is a top view of the turret.

FIG. 2 is an enlarged cross-sectional view taken along the line 2—2 of FIG. 1 of the turret device.

FIG. 3 is a view taken along the line 3—3 of FIG. 1 showing a range of elevations at some azimuth location.

DESCRIPTION OF THE PREFERRED EMBODIMENT

Referring to FIG. 2, a rotatable turret 2 is shown mounted with respect to a housing 4. The turret comprises four main portions, (1) an enclosure 6 located externally of said housing, (2) mounting and supporting means 8 connected to said housing, (3) drive means 10 located within said housing and, (4) an optical system for permitting a laser beam to be directed therethrough and aimed. The enclosure 6 comprises a platform 12 with a cover 14 fixed thereto. This cover can be attached to the platform 12 by bolts or any other known connecting means desired. The cover has a cylindrical section 16 with an outwardly curved top 18. A cutout 20 is made in said cover and cylindrical section to permit elevation control of a laser beam passing therethrough.

The supporting means 8 includes a cylindrical member 22 having a flange 24 at its upper end. This flange 24 is fixed to the platform 12 of the enclosure 6 by any means desired. The platform 12 has an opening 26 therein which opens into said cylindrical member 22 and has a diameter equal to the inner diameter of the cylindrical member 22. This cylindrical member is threaded at 28 for a purpose to be hereinafter described.

An annular ball bearing unit 30 having an inner and outer ring is positioned with its inner ring engaging the outer surface of the cylindrical member 22. This inner ring is placed with its upper edge against the flange 24. Spacing sleeve 32 is then placed over the cylindrical member 22 and positioned abutting the upper inner ring. A second annular ball bearing unit 34 having an inner and outer ring is placed on the cylindrical member 22 and its inner ring is placed abutting the bottom end of spacing sleeve 32. A sleeve 40 surrounds the ball bearing units 30 and 34, and the spacing sleeve 32. The sleeve 40 extends between the upper edge of the outer ring of ball bearing unit 30 and the lower edge of the ball bearing unit 34. An annular flange 42 extends inwardly from the inner diameter of sleeve 40 and abutts the bottom of the outer ring of the ball bearing unit 30. An annular flange 44 extends inwardly from the inner diameter of sleeve 40 and is above the top of the outer ring of ball bearing unit 34. Sleeve 40 is fixed in an opening 46 by any means desired. It can be seen that this arrangement permits rotation of the enclosure 6 above housing 4. An annular nut 36 is placed on said cylindrical member 22 to engage the threaded portion 28 referred to above and hold the assembly operatively together.

The drive means 10 includes a motor mounted in the housing 4 with an output drive gear 52. Gear 52 meshes with a driven gear 56 which is fixedly mounted to the bottom of the cylindrical member 22. It can be seen that as the moveable turret control 60 is actuated to send a signal to the motor 50 to rotate it in one direction or the other, such movement of the motor will rotate the enclosure 6 to aim it in azimuth in one direction or the other through the gears 52 and 56 and the cylindrical member 22.

The optical system includes two mirror devices 70 and 72 which are each connected to the platform 12 in the enclosure. The device 70 has a reflecting mirror 74 mounted for movement about a horizontal axis in a yoke 76. A trunnion extends from each side of the mirror 74 and each trunnion is pivoted in one curved arm of the yoke 76. A motor 78 fixed to one of said curved arms is connected to a trunnion so as to actuate the mirror about a horizontal axis. The yoke 76 is mounted on the free end of a shaft 82 which is fixedly mounted on the platform 12. The horizontal axis about which the mirror 74 is rotated on the yoke 76 is placed at an angle so that it will reflect a beam to one side of a second reflecting mirror to be hereinafter described. Motor 78 is fed a signal from a moveable mirror control 80 through slip rings 79 and 81 to move the mirror about the trunnions and aim it in elevation.

The device 72 has a second reflecting mirror 94 fixedly mounted on the end of a pair of support arms 96 which are in turn fixed to the platform 12. The mirror 94 is positioned over the opening 26 so that the centerline of the cylindrical member 22 intersects the center of the reflecting side of the mirror, and is angled so that a beam extending along the centerline of the cylindrical member 22 would be reflected into the center of the reflecting side of mirror 74. The beam would then be reflected out of cutout 20, clearing the second reflecting mirror 94.

The movement of the mirror 74 about its trunnions is limited by stops to a degree of movement as shown in FIG. 3. The upper limit stop is placed to come into effect when the laser beam is directed at an angle of 90° to the platform, and the lower limit stop is placed to come into effect when the laser beam is directed downwardly and will contact housing structure. The lower limit extends 360° around the turret and can vary depending on the shape of the housing structure. If the turret is placed under a housing, the stops would limit movement in the opposite direction. These stop limits dictate the lower edge of the cutout 20. To achieve a greater degree of downward movement in FIG. 3, a larger enclosure is necessary with longer arms 96 and shaft 82. The arms 96 and shaft 82 could be made adjustable.

A laser device 100 has an output beam 102 which is aimed at the reflecting side of mirror 94. It then is reflected to the reflecting side of mirror 74 and out of cutout 20.

Controls for such a device are shown in Application Ser. No. 733,221 to Richard C. Mulready for a Mirror Device filed herewith, now U.S. Pat. No. 3,514,776.

It is to be understood that the invention is not limited to the specific description above or specific figures shown, but may be used in other ways without departure from its spirit as defined by the following claims.

We claim:

1. A turret device for directing a laser beam comprising, an enclosure having a cutout portion, support means for supporting said enclosure, an opening through said support means, said enclosure having a cylindrical member fixed thereto, said cylindrical member passing through said opening, said cylindrical member being mounted for rotation relative to said support means, a laser device for emitting a laser beam of high power and directing it into said cylindrical member and enclosure, means for rotating said enclosure, an optical system in said enclosure for directing said laser beam in said enclosure through said cutout portion, wherein said optical system includes a first reflecting surface located in line with said cylindrical member, and a second reflecting surface positioned to receive a reflective beam from said first reflecting surface, the second reflecting surface being pivotally mounted to provide for an angular range of output through said cutout.

2. A combination as set forth in claim 1 wherein said first reflecting surface is fixed with respect to said enclosure and said second reflecting surface is rotated with respect to said enclosure.

3. A combination as set forth in claim 1 wherein said beam is reflected from said second reflecting surface at an angle to said first reflecting surface to prevent interference of other turret elements.

* * * * *